(12) United States Patent
Thomasset

(10) Patent No.: US 8,468,785 B2
(45) Date of Patent: Jun. 25, 2013

(54) CONTAINER FOR HOT-FILLING

(75) Inventor: Jacques Thomasset, Vouvry (CH)

(73) Assignee: Aisapack Holding S.A., Vouvry (CH)

( * ) Notice: Subject to any disclaimer, the term of this patent is extended or adjusted under 35 U.S.C. 154(b) by 438 days.

(21) Appl. No.: 12/744,828

(22) PCT Filed: Nov. 17, 2008

(86) PCT No.: PCT/IB2008/054797
§ 371 (c)(1),
(2), (4) Date: May 26, 2010

(87) PCT Pub. No.: WO2009/069031
PCT Pub. Date: Jun. 4, 2009

(65) Prior Publication Data
US 2010/0300043 A1 Dec. 2, 2010

(30) Foreign Application Priority Data
Nov. 27, 2007 (EP) .................................. 07121609

(51) Int. Cl.
*B65B 49/00* (2006.01)
(52) U.S. Cl.
USPC ............................................. 53/465; 53/48.2
(58) Field of Classification Search
USPC .................... 53/465, 48.1, 48.2, 49
See application file for complete search history.

(56) References Cited

U.S. PATENT DOCUMENTS

| 4,024,975 | A | * | 5/1977 | Uhlig | 215/373 |
| 4,039,641 | A | * | 8/1977 | Collins | 264/28 |
| 4,108,937 | A | * | 8/1978 | Martineu et al. | 264/529 |
| 4,164,298 | A | * | 8/1979 | Nishikawa et al. | 215/42 |
| 4,264,558 | A | * | 4/1981 | Jacobsen | 264/523 |
| 4,358,491 | A | * | 11/1982 | Ota et al. | 428/35.7 |
| 4,481,163 | A | * | 11/1984 | Ota et al. | 264/513 |
| 5,409,751 | A | * | 4/1995 | Suzuki et al. | 428/36.9 |
| 5,498,650 | A | * | 3/1996 | Flexman et al. | 524/114 |
| 5,849,401 | A | * | 12/1998 | El-Afandi et al. | 428/215 |
| 5,910,545 | A | * | 6/1999 | Tsai et al. | 525/178 |
| 6,248,430 | B1 | * | 6/2001 | Toyoda et al. | 428/213 |
| 6,290,896 | B1 | * | 9/2001 | Suzuki et al. | 264/544 |
| 2007/0187876 | A1 | | 8/2007 | Cink et al. | |
| 2010/0018166 | A1 | | 1/2010 | Outreman | |

OTHER PUBLICATIONS

International Search Report for PCT/IB2008/054797, mailed Jul. 2, 2009.
French-language Written Opinion of the International Searching Authority for PCT/IB2008/054797, mailed Jul. 2, 2009.
English Translation of International Preliminary Report on Patentability (IPRP) for PCT/IB2008/054797, mailed Jul. 2, 2009.

\* cited by examiner

*Primary Examiner* — Sameh H. Tawfik
(74) *Attorney, Agent, or Firm* — Nixon & Vanderhye P.C.

(57) ABSTRACT

The invention relates to a process for manufacturing and hot-filling a PET container comprising the following steps:
  a) providing a PET preform capable of being blow molded;
  b) blow molding the preform in the cavity of a mold so as to form a container;
  c) removing the container from the mold cavity;
  d) filling the container with a liquid, the temperature of which is above 80° C.;
  e) sealing the container in a leaktight fashion;
  f) sterilizing and cooling the container; and
  g) shrinking the container,
characterized in that:
  in step a) a PET preform composed of a copolymer based on terephthalic acid is used;
  in step a), at least one part of the preform is at a temperature greater than or equal to 110° C.;
  the temperature of the mold used in step b) is less than or equal to 65° C.; and
  during step g) the container is heated for a duration between 1 and 5 seconds at a temperature between 600 and 1000° C. in at least one part of the container so as to create a shrinkage and a reduction in the volume of the container.

The invention also relates to a container obtained using the process described above.

3 Claims, No Drawings

CONTAINER FOR HOT-FILLING

This application is the U.S. national phase of International Application No. PCT/IB2008/054797 filed 17 Nov. 2008, which designated the U.S. and claims priority to EP Application No. 07121609.7 filed 27 Nov. 2007, the entire contents of each of which are hereby incorporated by reference.

FIELD OF THE INVENTION

The present invention relates to a hot-filled polyethylene terephthalate (PET) container, and also to the process for filling said container. The process applies, in particular, to the packaging of a product at above 80° C. in a PET bottle that has not been manufactured with blow-molding processes that are referred to as "Heat Resistant" and that are more commonly denoted by the letters HR.

PRIOR ART

Polyethylene terephthalate (PET) bottles are used in many fields owing to their excellent properties of resistance, lightness, transparency and organolepticity. These bottles are manufactured at a high production rate by biaxially stretching a preform in a mold.

In the present text, the expression "hot-filling" should be understood to mean a filling where the temperature of the liquid is above ambient temperature, in general above 80° C.

The expression "cold-filling" is understood to mean ambient temperature or a temperature below ambient temperature.

The manufacture of PET bottles for cold-filled bottles resorts to the process of blow molding a preform in the cavity of a mold. The preform manufactured by injection molding resembles a tube, one end of which is plugged and the other end of which forms a neck. After heating this preform via infrared radiation up to 95/120° C., the amorphous PET is softened and undergoes a deformation by blow molding in the cavity of a mold. During the blow-molding phase, the preform is deformed biaxially due to the combined action of a stretching rod and due to the air introduced under pressure into the preform and that causes inflation. The molds are water-cooled in order to dissipate the heat of the PET by contact, which has the effect of setting the geometry of the bottle. The bottles obtained are said to be biaxially oriented since during their manufacture they have undergone biaxial stretching. The macromolecular chains thus oriented lead to excellent mechanical and optical properties at ambient temperature. The drawback of this biaxial orientation results from its reversible nature and the material seeks to return to its initial state as soon as the temperature increases; a phenomenon known as shape memory.

Thus, although these bottles offer many advantages, they have the drawback of deforming when their temperature is above 60° C. Filling these bottles with a product at a high temperature 85/95° C. causes such deformations that said bottles become unfit for use. Several processes for remedying the aforementioned drawback and allowing PET bottles to be hot-filled have been described in the prior art.

The most common solution for allowing a PET bottle to be filled with a hot liquid consists in jointly using a process known as a "Heat Resistant" bottle blow-molding process, and also a specific bottle design.

The processes known as "Heat Resistant" processes, and more commonly denoted by the letters HR, make it possible to improve the heat resistance of the bottles. Thus, there is a first HR process, referred to as a one-part process, which allows filling temperatures of 80 to 88° C. to be achieved. A second HR process, referred to as a two-part process, allows liquids to be packaged at temperatures of 88 to 95° C.

In the same way as HR bottle manufacturing processes, it is necessary to resort to different bottle designs. During packaging, the bottles must withstand the vacuum generated by the cooling of the liquid when said bottle has been stoppered at high temperature. The cooling causes a double contraction, that of the liquid and that of the air trapped in the bottle. Thus, hot-filled bottles comprise compensating panels that make it possible to absorb the variation in volume, and more rigid parts that prevent an uncontrolled deformation of the bottle. These designs require greater wall thicknesses and result in bottles for which the weight may range up to two times the weight of a cold-filled bottle.

The HR processes used to make bottles that are designed to be hot-filled also resort to the blow molding of a preform in the cavity of a mold, but with more sophisticated and more complex operating parameters. Specifically, the preform is heated at a higher temperature than in the case of blow molding a cold-filled container. The high blow-molding temperature makes it possible to minimize the shape memory of the PET and to relax some of the stresses due to the blow molding. In the case of the one-part HR process, the bottle is subjected to a heat treatment when it comes into contact with the walls of the mold. The high temperature of the walls of the mold has the effect of increasing the crystallization of the biaxially oriented PET chains and thus improving its temperature resistance. A circulation of air inside the bottle makes it possible to discharge the heat from the PET and thus solidify the walls of the bottle before the removal of the mold. In the case of the two-part HR process, the process makes it possible to attain a higher heat resistance but at the cost of a succession of more complex steps. Specifically, the first step consists in blow molding a preform, the volume of which is much greater than that of the bottle; this preform, having a high degree of crystallization, is then shrunk by heating beyond the glass transition; the shrunken preform is finally blow molded in the cavity of a mold corresponding to the dimensions of the bottle to be manufactured. The bottle has a high degree of crystallization, which allows filling at temperatures between 88 and 95° C.

However, the bottles that have undergone a heat treatment in order to allow the packaging of a liquid at high temperature have several drawbacks.

A first drawback is linked to the reduction in the bottle production rate because the heat-setting process slows down the blow-molding cycle. The HR processes are more complex than the conventional blow-molding process and consequently more costly to set up and to use.

A second drawback is linked to the weight and consequently to the cost of these bottles. As has been explained previously, the addition of material makes it possible to withstand the vacuum that is created in the container and the high filling temperature. However, the current solution uses an excess of material, which is not strictly necessary for good preservation of the product. Furthermore, the compensating panels detract from the appearance of the container, making it less attractive to the consumer.

Patent Application FR2887238 proposes to partly overcome the aforementioned drawbacks by producing thin-walled bottles suitable for hot-filling. These bottles are manufactured using a one- or two-part HR blow-molding process as explained previously and consequently have properties that allow hot-filling without shrinkage of the container. The bottles proposed in Application FR2887238 have many advantages since they do not comprise shrinkage panels, and have a reduced weight compared to the containers used by a person skilled in the art, this weight being substantially equivalent to that of the containers used to hold mineral water, at equal capacity. The container is of cylindrical shape, optionally with grooves to stiffen the body, with a light base like that of the containers for still mineral water, but reinforced. This container is hot-filled on a filler of known type, the liquid being brought to and maintained at a temperature of 60 to 95° C. depending on the targeted applications. After stoppering at high temperature and cooling, a vacuum is created in the bottle, which creates a significant deformation of the body of the bottle. The process, according to Application FR2887238, consists in reducing the volume of the bottle by causing a heat shrinkage of the walls of the bottle when the temperature of the liquid is below a transition of around 40 to 50° C. Despite the many advantages that it provides, Patent Application FR2887238 has several drawbacks.

A first drawback is linked to the method of manufacturing these bottles which requires a one- or two-part HR blow-molding process in order to render the container sufficiently temperature resistant. As has been explained previously, these manufacturing processes are complex and consequently more difficult to exploit. This has a repercussion on the cost of the containers produced.

The second drawback of the process proposed lies in the difficulty in shrinking the volume of the container by heating, bearing in mind that said container was manufactured by using a HR blow-molding process that makes it more temperature resistant.

General Presentation of the Invention

The invention proposes to overcome the aforementioned drawbacks by means of a novel container manufactured and hot-filled according to a novel process.

According to the invention, the PET container for hot-filling is manufactured using a conventional blow-molding process, that is to say a process commonly used for producing cold-filled containers. According to the invention, the container is blow molded in a "cold" mold, unlike the "Heat Resistant" or "HR" blow-molding processes that consist in blow molding the container in a mold at high temperature.

The filling process comprises an additional step compared to the hot-filling commonly used. This step consists in shrinking the walls of the container using a high-intensity heat source.

The container is differentiated from hot-filled containers by its geometry without compensating panels, by its base of petaloid or star type, by its low weight, by its low average density and by the spatial distribution of its density.

The invention makes it possible, in particular, to manufacture a low-weight container, the hot-fillability of which is not provided by a HR blow-molding process but by the unexpected combination of several factors including the geometry of the container, the composition of the container and the manufacturing and filling process.

The weight of the container according to the invention is substantially equivalent to that of a container, e.g. a bottle, intended to contain a cold-filled liquid.

It should be noted, furthermore, that the container according to the invention is designed to withstand the pressure and not the vacuum as is proposed in the prior art. Advantageously, the base of the container is designed to withstand a positive pressure in the container.

The invention also comprises a process of hot-filling a container, such as a PET bottle, which has not been manufactured using a HR process and of which the hot-fillability results from the combination of the design of the bottle and its method of manufacture. The filling process additionally comprises a step of shrinkage of the container, under the effect of an intense heat source, when the hot-filled liquid is completely or partly cooled.

DETAILED PRESENTATION OF THE INVENTION

The invention will be better understood below by means of an example that describes the manufacture of a hot-filled PET bottle which is manufactured from a preform according to a conventional blow-molding process that is not a HR process. The bottle has a high temperature resistance due to an unexpected synergy between the geometry of the bottle, the manufacturing and filling process and the resin used.

Unlike the solutions of the prior art which propose to increase the crystallinity of PET containers in order to improve their temperature resistance, the invention proposes the use of a container for which the lower degree of crystallization alone does not enable it to withstand the filling temperature. The heat resistance of the container results from the combined action of the degree of crystallization, of the geometry of the container and of the blow-molding and filling process. The invention is of great interest since it makes it possible to avoid the one- or two-part HR manufacturing processes used to increase the degree of crystallization of the container. These processes comprise complex steps that slow down the rate of production and that have a great impact on the cost of the containers produced.

As indicated above, the detailed example of the invention describes PET bottles, but it goes without saying that the invention is not limited to this type of object. Other types of containers, e.g. made of PET or similar resins, also form the subject of the invention. The bottle comprises a neck, a generally cylindrical body and a base. The weight of the bottle is similar to that of a bottle for mineral water or a carbonated drink, at equivalent capacity.

The neck is of reduced thickness compared to the necks of bottles manufactured using a HR process. For example, the neck of a bottle for a carbonated drink is particularly suitable.

The body of the bottle is generally of cylindrical shape, of small thickness and may comprise ribs that provide the rigidity. The bottle does not comprise the characteristic elements of hot-filled PET bottles, such as panels, band, bulb at the shoulder. According to one preferred embodiment of the invention, the cylindrical body comprises, however, a contracting zone intended to eliminate the vacuum in the bottle after partial or complete cooling of the liquid. The contracting zone is preferably localized. The filling process comprises a step of intense heating of said contracting zone, which has the effect of eliminating the vacuum in the bottle. Under the effect of the heat, the contracting zone shrinks and creates a reduction in the volume of the bottle.

Advantageously, the bottle comprises a base endowed with specific characteristics. Unlike what is proposed in the prior art, only the bases having a high pressure resistance may be used. Surprisingly, the bases of petaloid type used for the containers of carbonated drinks are barely deformed under the effect of the temperature. The bases of star type that are sufficiently pressure resistant may also be suitable.

The bottles are manufactured using a conventional blow-molding process without a post-stretching crystallization step in the cavity of the mold. A specific control of the blow-molding process is however necessary in order to obtain a bottle that is not deformed under the effect of the filling temperature.

This process comprises a first step that consists in heating a preform to the maximum permissible temperature, close to the crystallization. Advantageously, the preform is heated at a temperature above 110° C. The PET grades known to a person skilled in the art for producing bottles known as "heat set" bottles are used. These grades are generally high molecular weight products or copolymers of PET. The PET copolymers obtained from terephthalic and isophthalic acids are particularly suitable.

The preform is stretched and blow molded in the cavity of a mold of suitable geometry, the walls of which are cooled in order to dissipate the heat transmitted by contact, which has the effect of setting the walls of the bottle. Unlike the HR process where the mold is heated at a temperature generally between 115 and 140° C. in order to increase the crystallinity of the side walls of the bottle, the invention makes it possible to use the conventional blow-molding process that consists in using molds that are cooled or at the very most tempered at a temperature below the glass transition temperature of PET (around 65° C.). The part of the mold that forms the base of the bottle is advantageously cooled at a temperature below 20° C.

Astonishingly, it has been found that the colder the part of the mold that forms the base, the lower the deformation of the base of the bottle under the effect of the temperature. This surprising result goes against the current process which consists in increasing the temperature of the mold in order to increase the crystallization and relax the stresses of the polymer chains.

The bottles are produced at a high production rate in a similar manner to the bottles intended to contain mineral water or carbonated drinks.

Multilayer PET bottles manufactured and filled according to the process described in the invention are advantageously used to contain oxygen-sensitive and hot-filled products such as fruit juice. The bottles are manufactured from a multilayer preform blown in a mold, the temperature of which is below 65° C. The geometry of the bottle is similar to that of a single-layer bottle described in the invention. The bottle does not comprise the characteristic elements of hot-filled PET bottles, such as panels, band, bulb at the shoulder. According to one preferred embodiment of the invention, the cylindrical body comprises, however, a contracting zone intended to eliminate the vacuum in the bottle after partial or complete cooling of the liquid.

The hot-filling of single-layer or multilayer bottles may be carried out rapidly after blow molding the bottles, or after a variable period of time. An immediate filling is advantageous since the dry bottles have a better thermal stability. However, for logistical reasons, the bottles are generally filled after a relatively long storage time during which an equilibrium is produced between the moisture in the air and that in the walls of the bottle. This uptake of water slightly reduces the heat resistance of the bottle.

The filling of the bottle is differentiated from hot-fillings by the step of shrinking the contracting zone, a step that makes it possible to eliminate the vacuum created in the bottle after cooling.

The filling is generally carried out by gravity, the hot liquid flowing directly into the container. Depending on the products, the filling temperature is between 80 and 95° C.

When the hot liquid flows into the bottle, the wall of the container is rapidly heated without however deformations of the bottle being able to be observed. The container is then hermetically sealed using a stopper. The increase in the temperature of the air trapped in the head space has the effect of creating a slight pressure in the bottle after sealing.

Since the base has been designed to withstand the pressure, it does not deform despite the high temperature of the liquid in the bottle. The walls of the container are sterilized via the temperature of the product for a duration of around 3 minutes. The sterilization operation comprises an upturning of the bottle to ensure the sterilization of the inside face of the stopper and of the neck.

Next, the bottle is cooled rapidly by spraying cold water onto its outer wall. On cooling, the liquid and the head space contained in the container contract, creating a vacuum in the bottle. Under the effect of the negative pressure, the side walls of the bottle of thin thickness deform by "collapsing". It is advantageous to provide, in the design of the bottle, flexible zones that deform by collapsing under the effect of the negative pressure, and more rigid zones that do not deform. The deformation of the bottle is thus localized in one defined zone. It has been found that the flexible zone advantageously forms a cylindrical geometry of oval or circular cross section.

When the temperature of the liquid contained in the bottle has reached a temperature below 50° C., the bottle is heated at a high temperature at the contracting zone. The heating of the contracting zone has the effect of reducing the volume of the bottle by shrinking the contracting zone. The reduction in volume of the bottle created by the shrinkage compensates for the variation in volume of the liquid and cancels the vacuum inside the container.

Unlike what is proposed in the prior art, this heating is difficult to carry out by radiation since the supply of energy is not rapid enough to prevent a significant reheating of the liquid.

The shrinkage step requires an intense energy supply over a very brief duration. It has been found that the bottle could be heated by flame treatment, which causes a rapid and reproducible shrinkage of the contracting zone. As the wall of the bottle is in contact with a cold liquid on its inner face, the outer face may be brought into direct contact with a very high temperature flame for a very short time. Heating by hot air may also be used.

Compared to what is proposed in the prior art, it has been found that the bottle must be heated symmetrically, otherwise the bottle loses its verticality and the final geometry is not reproducible. Preferably, during the shrinkage step, the bottle is rotated in front of two heat sources that are positioned symmetrically with respect to the axis of rotation. Advantageously, the distance between the wall of the bottle and the heat source is constant.

Before the shrinkage step, the geometry of the contracting zone advantageously forms a homogeneous convex surface around the circumference of the bottle. The convex surface has several advantages with respect to a cylindrical, conical or concave surface. It has been found that the shrinkage of a convex surface stabilizes the shrinkage process and enables a high reproducibility of the final geometry of the bottle. When the contracting zone is not convex, great variations in the perpendicularity between the axis of the neck and the base of the bottle are sometimes observed.

The invention proposes the use of a container for which the lower degree of crystallization alone does not enable it to withstand the filling temperature. The heat resistance of the container results from the combined action of the degree of crystallization, of the geometry of the container and of the blow-molding and filling process. The bottle comprises a contracting zone having a degree of crystallization 2% greater than any other part of the bottle except for the neck when the latter is crystallized. The bottle therefore has a denser or more crystalline zone in the contracting zone. This zone is generally spread over the circumference of the bottle, thus forming a ring of higher density in the side wall of the bottle.

The invention was described previously for a bottle comprising an uncrystallized neck. Many processes are known by a person skilled in the art for improving the thermal stability of the necks when filling at a high temperature in order to prevent the latter from deforming. The processes used to obtain them may be easily combined with the present invention. However, against all expectations, it has been found that lighter neck geometries commonly used for the packaging of carbonated drinks could be used successfully in the context of the present invention.

The bottle obtained by the manufacturing and hot-filling process is distinguished from known bottles for hot-filling by:
- a low weight;
- the absence of compensating panels;
- a pressure-resistant base;
- a neck which may be of reduced weight;
- a contracting zone that forms a more crystalline ring; and
- a positive internal pressure after filling.

The positive internal pressure after filling has many advantages, in particular for the storage of the bottles. This is because, despite their low weight, these bottles have a high resistance to vertical compression due to the positive pressure in the container. The stacking height of the bottles is consequently increased. The positive pressure in the bottle after filling is also manifested during the opening of the bottle by the consumer. The bottles described in the prior art are under vacuum after filling and see their level decrease during opening whereas the bottle obtained according to the invention sees its level remain constant or increase slightly during opening.

Example

The bottle had a weight of 24 g for a capacity of 500 ml. The base was of petaloid type, the body had an upper cylindrical zone of small thickness, and a lower convex contracting zone. This bottle was obtained by blow molding a preform heated at 100° C. in a mold at 12° C. A PET copolymer based on terephthalic and isophthalic acids was used to mold the preforms (Cleartuf P85HF from M&G Polimeri Italia). The bottle was stored for 3 days before filling. The bottle was rinsed and filled at 85° C. according to the filling procedure used in the profession. After cooling the bottle, the upper zone was deformed under the effect of the vacuum in the bottle. The deformation of the upper zone created a reduction in the volume of the bottle substantially equal to 3.5%. The convex contracting zone was then heated by flame treatment for 1 to 5 s and advantageously for 3 s. During the shrinkage step, the bottle was rotated in front of two diametrically opposed flame treatment stations. After shrinkage, the vacuum in the bottle was eliminated; the upper zone regained its initial geometry and the initially convex contracting zone formed a cylindrical surface. The bottle comprised a contracting zone having a degree of crystallization greater than 34% whereas the degree of crystallization of the other parts of the bottle was less than or equal to 32%. The bottle therefore had a denser or more crystalline zone in the contracting zone. This zone was generally spread over the circumference of the bottle thus forming a ring of higher density in the side wall of the bottle.

The invention claimed is:

1. A process for manufacturing and hot-filling a PET container comprising the following steps:
   a) providing a PET preform capable of being blow molded according to a conventional process which is not a heat resistant process,
   b) blow molding the preform in a cavity of a mold so as to form a container;
   c) removing the container from the mold cavity;
   d) filling the container with a liquid, the temperature of which is above 80° C.;
   e) sealing the container in a leaktight fashion;
   f) sterilizing and cooling the container; and
   g) shrinking the container,
   wherein:
   in step a) a PET preform composed of a copolymer based on terephthalic acid is used;
   in step a), at least one part of the preform is at a temperature greater than or equal to 110° C.;
   the temperature of the mold used in step b) is less than or equal to 65° C.; and
   during step g) the container is heated for a duration between 1 and 5 seconds at a temperature between 600 and 1000° C. in at least one part of the container so as to create a shrinkage and a reduction in the volume of the container.

2. The process as claimed in claim 1, wherein a bottom of the mold is maintained at a temperature below 20° C.

3. The process as claimed in claim 2, wherein the bottom of the mold is maintained at a temperature between 1 and 15° C.

* * * * *